March 25, 1958    S. E. RICHESON    2,827,845
BEVERAGE MAKING MACHINE
Filed June 16, 1955    6 Sheets-Sheet 2

*INVENTOR.*
SANFORD E. RICHESON
BY
*Hane and Nydick*
ATTORNEYS

March 25, 1958 S. E. RICHESON 2,827,845
BEVERAGE MAKING MACHINE
Filed June 16, 1955 6 Sheets-Sheet 3

INVENTOR.
SANFORD E. RICHESON
BY Hame and Nydick
ATTORNEYS

March 25, 1958 S. E. RICHESON 2,827,845
BEVERAGE MAKING MACHINE
Filed June 16, 1955 6 Sheets-Sheet 4

INVENTOR.
SANFORD E. RICHESON
BY
Hane and Nylick
ATTORNEYS

March 25, 1958  S. E. RICHESON  2,827,845
BEVERAGE MAKING MACHINE
Filed June 16, 1955  6 Sheets-Sheet 6

INVENTOR.
SANFORD E. RICHESON
BY Hamre and Nydick
ATTORNEYS

United States Patent Office 2,827,845
Patented Mar. 25, 1958

2,827,845

BEVERAGE MAKING MACHINE

Sanford E. Richeson, Queens Village, N. Y.

Application June 16, 1955, Serial No. 515,939

30 Claims. (Cl. 99—289)

The present invention relates to devices for preparing beverages by extracting flavor essences, stimulants and other desirable ingredients from substantially dry starting material by infusing the material with heated liquid. More particularly, the invention relates to coffee making and dispensing equipment.

While the equipment according to the invention is suitable for household use, its particular field of application is by users that are substantial consumers and require repeated brewing of quantities of coffee, such as restaurants, institutions, etc.

The invention further relates to the preparation of the starting material, such as grinding of coffee beans.

The brewing or steeping of coffee, tea and similar beverages in considerable quantities while simple in theory, requires in practice considerable experience and attention particularly when quantities of the beverage are to be prepared in rapid succession, and the result is often less than satisfactory. Apart from the quality and quantity of the used coffee or other starting material, the unsatisfactory result is often due to the fact that the extracting water or other liquid does not have the optimum temperature whereby the flavor of the brew is adversely affected, and that the coffee when ground in preparation of the brewing operation is subjected to excessive temperatures generated by and during the grinding operation. Such excessive temperatures have an adverse effect upon the flavor.

Another problem involved in the making of coffee and related beverages—which is of particular importance for restaurants and other larger consumers—is to extract the maximum quantity of beverage from a given quantity of coffee without sacrificing quality.

One of the major objects of the present invention is to provide a novel and improved device of the general kind above referred to, which produces from a given quantity of starting material such as ground coffee a maximum quantity of beverage of excellent and uniform quality.

Another object of the invention is to provide a novel and improved device of the general kind above referred to, in which the ground coffee and the extracting water are maintained in continuous contact and strongly agitated during the entire brewing or steeping operation and the water is supplied to the machine at an optimum temperature thereby assuring a maximum extraction of the desirable ingredients without extracting undesirable ingredients contained in the ground coffee such as fats and waxes.

Still another object of the invention is to provide a novel and improved device of the general kind above referred to, in which preheated air under pressure is forced into and through the container containing the ground coffee and the extracting water during the brewing operation thereby pressure agitating the mixture and thus increasing the efficiency of the extraction.

A further object of the invention is to provide a novel and improved device of the general kind above referred to, in which washing means flush the container in which the brewing has taken place and the associated piping thereby assuring the cleanliness that is essential for obtaining uniformly satisfactory results.

Another major object of the invention, allied with the preceding ones, is to provide novel and improved grinding means for grinding coffee beans which means are cooled to prevent an undesirable heating of the coffee while being ground thereby impeding or at least appreciably reducing the escape of flavor essences during the grinding operation.

Still another object of the invention is to provide an arrangement such that the heat generated by the grinding operation is used to preheat the water used for the brewing operation, such preheating of the water resulting in an efficient dissipation of the grinding heat.

A further object of the invention is to provide preferably adjustable dosing means for feeding predetermined quantities of coffee beans to the grinding means.

Another major object of the invention is to provide a novel and improved coffee making machine which includes in combination dosing means for supplying measured quantities of coffee beans, cooled grinding means for grinding said measured quantities, brewing means employing water and air under pressure and at controlled temperature for brewing the beverage, means for supplying the ground coffee, means for discharging the beverage from the brewing means, means for flushing the brewing means after discharge of the beverage, and control means for actuating the aforesaid means in a predetermined sequence and at a timed relationship.

Yet another object of the invention, allied with the preceding one, is to provide control means controlled by the quantity of beverage in a storage container and controlling the operation of the control means included in the coffee making machines.

A further major object of the invention is to provide dispensing means for dispensing the beverage at a plurality of tap points.

A still further object of the invention is to provide mixing means for mixing several beverages in said dispensing means.

Yet another object of the invention is to provide means for maintaining the beverage at a desired temperature while being within and passing through the dispensing means.

Yet a still further object of the invention is to provide control means responsive to the liquid contained in a storage container associated with the dispensing means and controlling the control means included in the aforesaid coffee making machine.

Other and further objects, features and advantages of the invention will be pointed out hereinafter and set forth in the appended claims constituting part of the application.

In the accompanying drawing several preferred embodiments of the invention are shown by way of illustration and not by way of limitation.

Referring first to Figs. 1 through 10 in detail, the coffee making machine according to these figures comprises as principal components or sub-assemblies a measuring means 25 for supplying a measured quantity of coffee beans to the machine; a grinding means 26 for grinding said measured quantity of coffee beans; brewing means 27 for brewing the beverage by infusing heated water into the ground coffee; feed means 28 for supplying the measured quantities of ground coffee to the brewing means; discharge means 29 for discharging the brewed beverage and the used coffee ground from the brewing means; a power drive 30 for operating the machine; and control means 31 for controlling the operation of the components of the machine in a predetermined sequence and at a timed relationship.

*Measuring means 25*

The measuring means comprises a hopper 35 for receiving a supply of coffee beans in excess of the aforementioned measured quantity. The hopper opens into a measuring chamber 36, the capacity of which corresponds to the desired measured quantity. A wall 37 of this chamber is pivoted to the structure of the machine at 38 to permit adjustment of the capacity of the measuring chamber. For this purpose, the free end of wall 37 coacts with a wall 39 so that the measuring chamber is closed in each pivotal position of wall 37. A pointer 40 secured to wall 37 and coacting with a calibrated scale 41 is preferably provided to facilitate setting of the measuring chamber for a desired quantity of coffee beans.

The lower end of the measuring chamber is open and leads to the grinding means 26.

Figure 1:
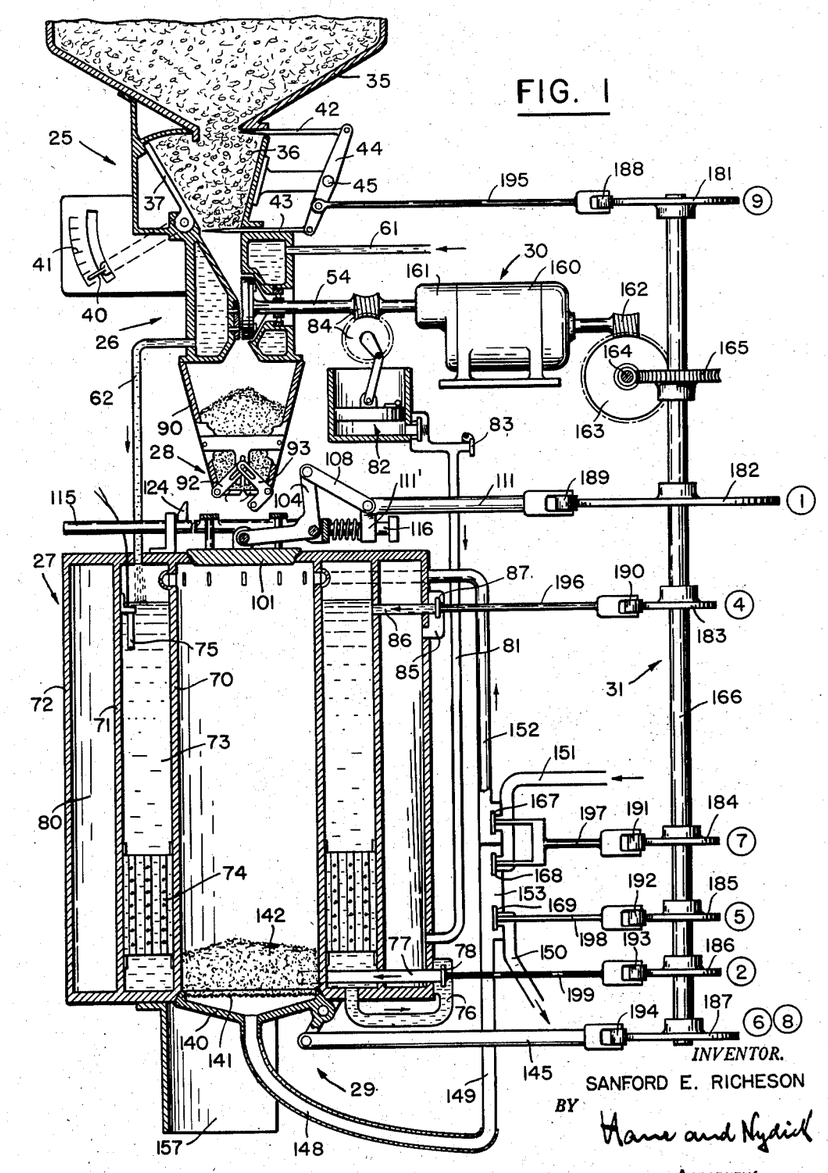
Fig. 1 is an elevational sectional view of a coffee making machine according to the invention.
Figure 2:
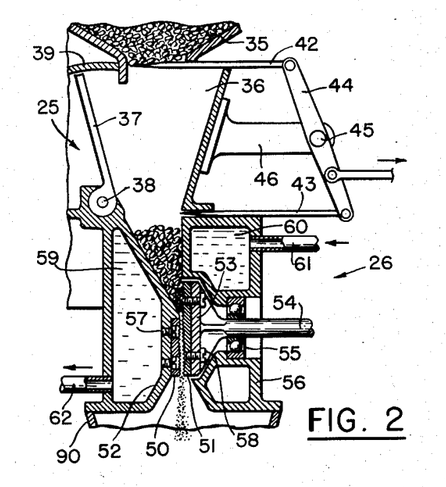
Fig. 2 is a sectional detail view of the dosing means and grinding means of the machine on an enlarged scale and in a different operational position.

To control the admission of coffee beans into chamber 36 and the discharge therefrom, the upper and lower opening of the measuring chamber are alternately closed. This is effected by means of an upper and a lower closure plate 42 and 43 respectively. Each plate may be horizontally slid either into a position covering the respective opening of chamber 36 or uncovering the same. Fig. 1 shows the inlet of chamber 36 open and the outlet closed, whereas in Fig. 2 the inlet is closed and the outlet is open. To facilitate the lateral movement of the closure plates, the forward edge of the same is preferably wedge shaped. Plates 42 and 43 are positioned by means of suitable linkage means shown as a see-saw arm 44 pivoted at 45 to a stationary support 46. The control of arm 44 will be more fully described in connection with the description of control means 31.

*Grinding means 26*

The grinding means comprise a stationary suitably surfaced grinding plate 50 and a rotary grinding plate 51 also suitably surfaced. The grinding plate 50 is secured to a stationary wall 52 of the housing structure and grinding plate 51 to a driving plate 53 mounted on or integral with a drive shaft 54 which is rotated by power drive 30. Drive shaft 54 is journalled by means of suitable bearings 55 in a wall 56 of the machine structure. As is apparent, the fineness of the grind is determined by the gap between grinding discs 50 and 51. Screws 57 and 58 or other suitable means permit adjustment of the spacing of the grinding discs to compensate for the wear experienced by the discs during use.

The walls and other structural parts in which the grinding discs are mounted, are jacketed to form spaces 59 and 60 for a coolant. The fresh coolant is admitted through a pipe 61 and the coolant heated by the heat generated during the grinding operation is discharged through a pipe 62. As is apparent, cooling of the coffee during the grinding operation effectively prevents a deterioration thereof by the volatization of flavor essences as a result of the developed grinding heat. The grinding heat is made useful by employing as coolant the water which is used as extracting water in the brewing means. In other words, the grinding means act in effect as a preheater for the brewing water. Fig. 1 shows that discharge pipe 62 leads into brewing means 27.

*Brewing means 27*

The brewing means are shown as comprising an upright cylindrical container 70 open at both ends. The arrangement of the feed means 28 and the discharge means 29 disposed in the open ends of container 70 will be described hereinafter. Container 70 is jacketed by an inner jacket 71 and an outer jacket 72. Jacket 70 forms an annular storage space 73 for brewing water, the quantity of which is determined by the capacity of space 73 and which is admitted into the space through pipe 62. The water preheated in the grinding means is heated to the temperature required for the brewing operation by suitable heating means shown as electric resistance heater elements 74.

To assure that the water in space 73 is heated to and maintained at the desired optimum temperature a thermostatic control is preferably provided which controls the setting of heater elements 74 in a manner well known.

Space 73 communicates with brewing container 70 through a pipe 76 and a pipe 77 issuing into the container near the bottom end thereof. A valve 78 diagrammatically shown controls the flow of water through pipes 76 and 77. The operation of valve 78 which is normally closed, will be described in connection with control means 31.

Outer jacket 72 together with inner jacket 71 forms an annular storage space 80 for air under pressure which is supplied through a pipe 81 by an air pump 82. This pump is shown as a conventional piston pump but a rotary pump may, of course, also be used, or any other suitable supply for air under pressure. A relief valve 83 prevents the build-up of an excessive air pressure in space 80. Pump 82 is driven from power means 30 to which it may be coupled through a suitable gear and worm drive 84.

Space 80 communicates with the upper end of space 73 through pipes 85 and 86. The flow of air through these pipes is controlled by a diagrammatically shown valve 87. This valve is operated by control means 31 as will be more fully described hereinafter. As will be noted, annular spaces 73 and 80 constitute an efficient heat insulation for container 70. Furthermore, the compressed air in space 80 already preheated by the compression in pump 82 is further heated by the hot water in space 73 before it is admitted into space 73.

Feed means 28

The feed means comprise a part receiving and temporarily storing the ground coffee delivered from the grinding means and a part controlling the admission of the ground coffee into container 70 through the upper end thereof and the closing and opening of said upper end.

The part for temporarily storing the ground coffee comprises a preferably hopper-shaped container 90 disposed directly below the grinding means to receive the ground coffee discharged therefrom. The lower open end of container 90 mounts a gate shown as having two wings 91. The opening and closing of the gate wings is controlled by levers 92 and 93. Each of the levers is pivotally supported by container 90 for pivotal movement in unison with the respective wing 91. The free end of each lever is slotted at 94 and 95 respectively. The overlapping ends of the slots are guided by a pin 96 which in turn is guided in a vertical slot 97 provided in an arm 98 secured to container 90. A loaded spring 99 biases the two gate wings into the closed position shown in Fig. 1. Lever 93 has a right angle extension 93' from which a pin 100 extends.

Extension 93' and pin 100 coact with the part of feed means 28 controlling the opening and closing of container 70, for the purpose of controlling the opening and closing of the gate of container 90.

The means for opening and closing container 70 constituting part of feed means 28, comprise a cover 101 which may be seated in an inlet opening 102 of container 70. To assure a tight seal, a sealing ring 103 is preferably provided. Cover 101 is pivotally supported on one arm of a bell crank lever 104 by means of two lugs 105 and a bearing pin 106. The other arm of lever 104 is pivotally held between one end of two arms 107 and 108 by means of a pin 109. The other ends of arms 107 and 108 are pivoted by means of a pivot pin 110 to a bar 111, the position of which is controlled by control means 31 more fully described hereinafter. The knee of bell crank lever 104 is pivoted by a pivot pin 112 to a cross-bar 113 of a frame structure further comprising two parallel rods 114 and 115. A rod 116 extending from cross-bar 113 slidably seats an extension 111' of bar 111. A loaded spring 117 disposed between bar 113 and extension 111' seeks to bias extension 111' from the position of Fig. 1 into the position of Fig. 3.

Parallel rods 114 and 115 are slidably guided in two lugs 118 and 119 secured to the top wall of brewing means 27. An enlarged head 120 or other suitable means limits displacement of rods 114, 115 toward the left as seen in the drawing. Four pins 121 extending from the upper side of cover 101 and passing through corresponding holes in two cross bars 122, 123 between rods 114, 115 serve to guide cover 101 so that the cover can perform an up and down movement relative to rods 114, 115 and the top wall of the container including opening 102.

One of the rods, to wit rod 115 has a nose or dog 124 coacting with pin 100 on lever arm 93'.

Figures 3, 6, 7:
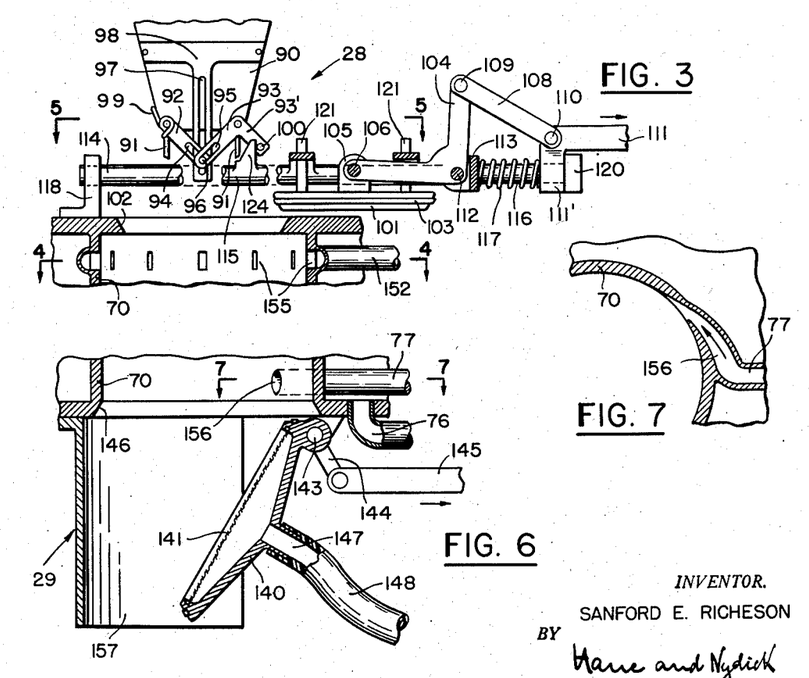
Fig. 3 is a sectional detail view of means for supplying measured quantities of ground coffee to the brewing chamber of the machine.
Fig. 6 is a sectional detail view of the lower part of the machine through which the coffee ground is discharged after completion of the brewing operation.
Fig. 7 is a section taken on line 7—7 of Fig. 6.
Figure 4:
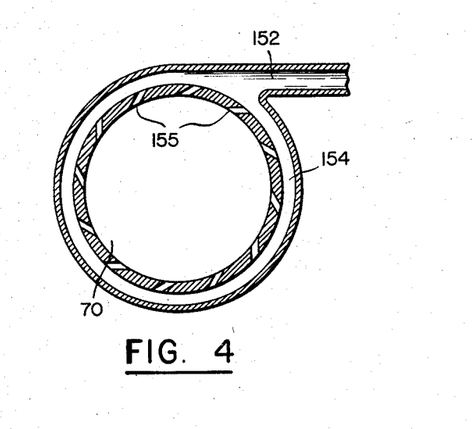
Fig. 4 is a section taken on line 4—4 of Fig. 3.
Figures 5, 8, 9, 10:
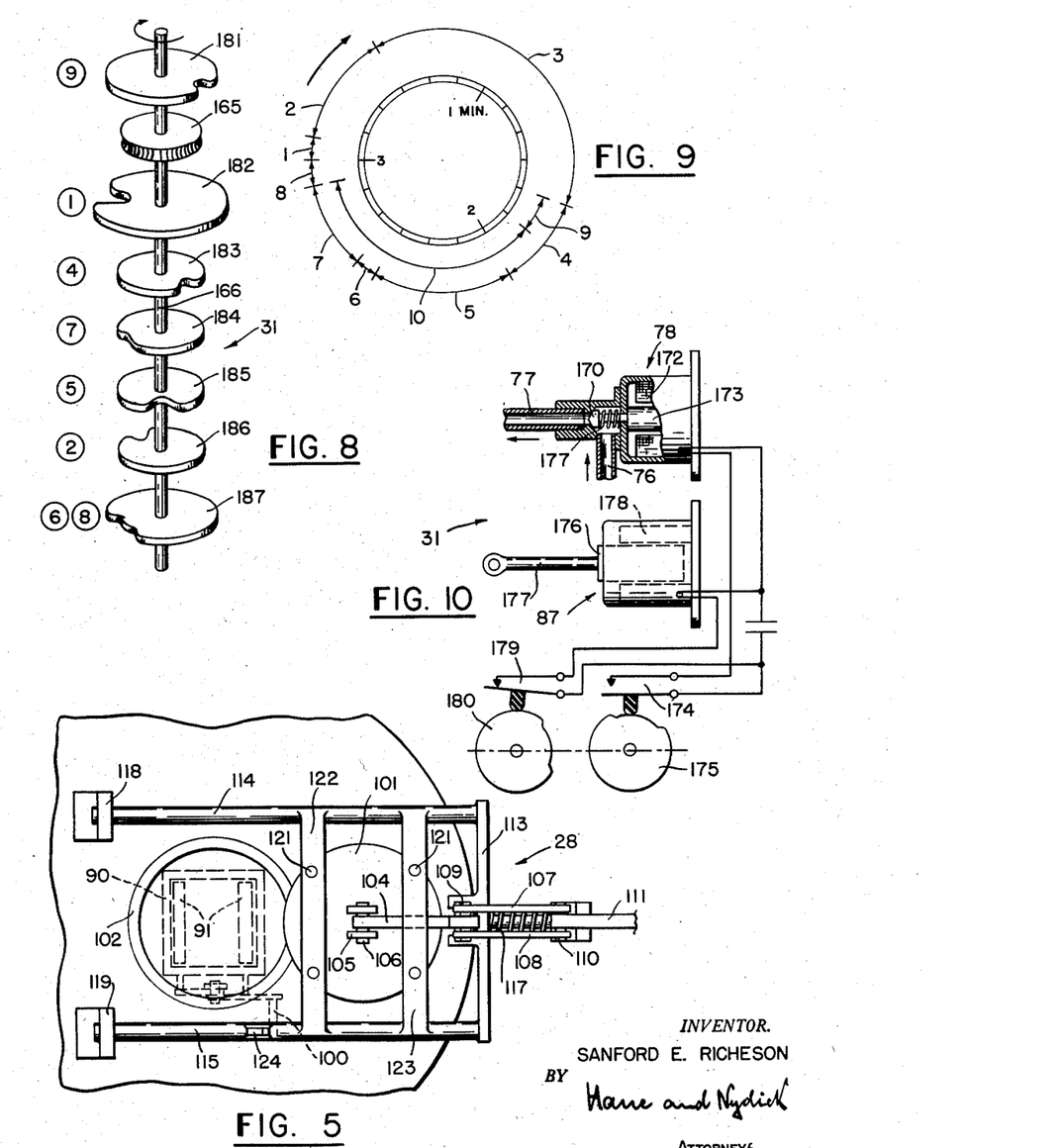
Fig. 5 is a plan view of Fig. 3.
Fig. 8 is an isometric view of a cam arrangement constituting part of the control means of the coffee making machine.
Fig. 9 is a chart showing the sequence and the timed relationship of the operations of the machine.
Fig. 10 is a view of some of the valves of the machine and the control thereof by the cam arrangement.

The operation of feed means 28 is as follows:

Let it be assumed that the feed means are in the position shown in Fig. 1, that is, the gate wings 91 are closed and cover 101 is seated in opening 102, and that it is desired to move the feed means into the position of Figs. 3 and 5 in which the gate is opened and opening 102 is uncovered. As is evident from the previous description, the uncovering of opening 102 and the opening of the gate must be so correlated that opening 102 is substantially uncovered prior to the beginning of the opening of the gate so that the ground coffee contained in container 90 can drop into container 70.

For this purpose, bar 111 is moved toward the right under the control of control means 31 as will be more fully described hereinafter. During the first part of the movement of bar 111 extension 111' thereof moves from the position of Fig. 1 into the position of Fig. 3 aided by the action of loaded spring 117. The resulting displacement of pivot 110 turns lever 104 about pivot 112 thereby lifting cover 101 out of opening 102 substantially in axial alignment therewith. As bar 111 continues its movement toward the right, rods 114 and 115 follow this movement toward the right thereby displacing cover 101 toward the right and away from opening 102. When rods 114 and 115 have reached a certain position of displacement nose 124 on rod 115 engages pin 100 thereby effecting opening of the gate wings as previously described. In the position of maximum displacement of rods 114, 115 toward the right, cover 101 occupies the position of Figs. 3 and 5 and the gate is opened as is shown in Figs. 3 and 5.

When bar 111 is moved toward the left under the control of control means 31, rods 114 and 115 are also moved toward the left thereby first effecting closing of the gate and then closing of opening 102 by cover 101. As will be noted, spring 99 urges the gate wings into the closed position when nose 124 is moved away from pin 100.

Figures 21, 22, 23:
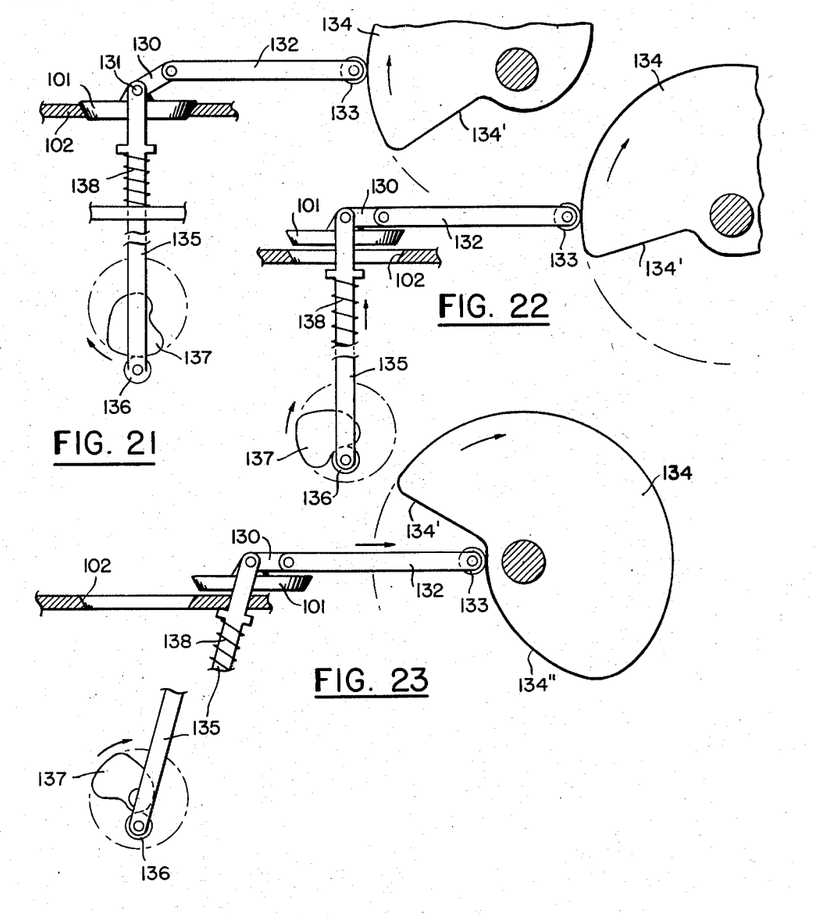
Fig. 21 is a modification of the means according to Figs. 3 and 5 for opening and closing the brewing chamber of the machine under the control of a cam arrangement, the brewing chamber being shown closed.
Fig. 22 is a view of the opening and closing means of Fig. 21 in a different operational position, the closure member of the means having been just lifted out of its seat in the top wall of the brewing chamber.
Fig. 23 is a view of still another operational position of the opening and closing means, the brewing chamber being shown fully opened.

Figs. 21, 22 and 23 show a different and somewhat simplified arrangement for opening and closing opening 102 of container 70. As shown in these figures, a link 130 is pivoted at 131 to a lug extending from cover 101. A second link 132 is pivoted on one end to the free end of link 130 and supports on the other end a cam roller 133 coacting with a suitably shaped camming surface on a rotary cam 134. There are further provided two links 135 straddling cover 101. One end of each link 135 is pivoted at 131 to cover 101 and the other end mounts a cam roll 136 coacting with the camming surface on a suitably shaped cam 137. A spring 138 biases cam roll 136 into engagement with cam 137. Cams 134 and 137 should be visualized as being rotated at a predetermined time relationship.

In the position shown in Fig. 21, cams 134 and 137 and the links coacting therewith occupy positions relative to each other in which cover 101 is seated in opening 102. When now cam 137 is rotated from the position of Fig. 21 into the position of Fig. 22, the camming surface on cam 137 causes lifting of cover 101 into the position above opening 102. As cam 134 continues its rotation, cam roll 133 leaves the circular part of the camming surface and reaches the radially inwardly leading part 134'. As a result, link 132 moves cover 101 from the position of Fig. 22 into the position of Fig. 23, the corresponding portion of the camming surface 137 now engaged by cam roll 136 permitting such movement. Upon further rotation of cam 134, cam roll 133 travels over camming surface 134" and the corresponding camming surface on cam 137. As a result, cover 101 is first returned into the position of Fig. 22 and then as cam roller 133 travels over the circular part of the camming surface on cam 134 into the position of Fig. 21.

To simplify illustration, the means causing cam rolls 133 and 136 to follow the camming surface on cams 134 and 137 respectively are not shown in detail. Such means are well known in the art. They may comprise appropriately loaded and arranged springs, or cam grooves positively guiding the follower cam rolls.

Discharge means 29

The discharge means comprise an appropriately dished tray 140 which is covered with a netting 141, the meshes of which have a suitable width. Netting or grid 141 serves to support the ground coffee 142 which enters the container 70 through opening 102 as previously described. Tray 140 is hinged to a stationary part of the machine such as the bottom of the brewing vessel by means of a pin 143 which also fixedly seats an arm 144 linked with its free end to a bar 145. This bar is caused to perform generally reciprocatory movements under the control of control means 131. The movements of the bar serve to move tray 140 either into the position of Fig. 1 in which a discharge opening 146 in the bottom of the container 70 is closed or into the open position of Fig. 6 in which opening 146 is uncovered. The bottom of tray 140 has a drain pipe 147 upon which is fitted a flexible hose 148 communicating through a pipe 149 with a discharge pipe 150. As is apparent, coffee brewed in container 70 will flow through netting 141 and the piping connected with tray 140 into discharge pipe 150.

There is further provided a flush system comprising an inlet pipe 151 which is divided in a branch 152 and a branch 153 leading into pipe 149. Branch pipe 152 extends through air chamber 80 and hot water chamber 73 into the upper end of container 70. It preferably communicates with container 70 by means of an annular ring 154 from which extend a plurality of tangentially directed nozzles or tuyères 155 to produce a cyclonic flushing effect within container 70 by water admitted through pipe 152 as can best be seen in Fig. 4.

Similarly, hot water inlet pipe 77 communicates with the lower part of container 70 through a tangential inlet or tuyère 156 to effect cyclonic motion of the hot water within container 70.

As shown, there are separate pipe lines for the hot water used for the brewing operation and the flushing water which may be hot or cold. However, it is also possible to admit the hot brewing water directly through the cyclonic inlets or tuyères 155, or vice versa the flushing water through the inlets or tuyères 156.

The flushing water is discharged through bottom opening 146 through which also falls out the used coffee ground. The flushing water will effect a thorough washing of netting 141. As is apparent, the flushing water flows through the container from the top thereof and also through the netting 141 in reverse direction through pipes 149 and 148. To direct the flushing water and the used coffee ground to a suitable wastage container disposed below the machine an apron 157 preferably extends downwardly from the bottom of container 70.

Power drive means 30

The power drive means are shown as comprising a conventional motor 160 which may operate at 1800 R. P. M. Motor 160 drives through a suitable reduction gear 161 the drive shaft 54 of grinding means 26 at the appropriate speed such as 300 R. P. M. and through worm and gear 84 pump 82 at a suitable speed such as 75 R. P. M. Motor 160 further drives through a suitable reduction gear shown as a worm 162, gear 163, a second worm 164 and a second gear 165 the control means 31, or more specifically a cam shaft 166 of the control means. The rotational speed of cam shaft 166 depends upon the period of time required for the brewing or steeping of the beverage in container 70. Generally one revolution in every 3 minutes is suitable.

As is evident, separate drive means may be provided for the several components of the machine, but a common drive means generally results in a more compact and less expensive design.

Control means 31

As is apparent, the operation of the machine requires that the several components are intermittently operated in a predetermined sequence and at a predetermined time relationship. It is the purpose of the control means to obtain such correlated operation. It is further apparent that a complete cycle of operation involves supplying a measured quantity of coffee beans to the machine, grinding the measured quantity, feeding the ground coffee into the brewing container, allowing sufficient time for brewing or steeping, discharging the brewed beverage, removing the used coffee ground and flushing the machine. It is also essential that a new batch of ground coffee is readied while the brewing of the preceding batch is in progrgess to permit brewing of batches of coffee in substantially continuous succession.

As already mentioned, the admission of hot extracting water into container 70 is controlled by valve 78 and the admission of air under pressure into chamber 73 by a valve 87. The admission of the flushing water into pipes 152 and 153 is controlled by valves 167 and 168 respectively and the discharge of the beverage through pipe 150 is controlled by a valve 169. All the aforementioned valves should be visualized as being urged into the closed position.

The valves may be of any conventional design, they may be mechanically, hydraulically or electromagnetically operated valves.

Fig. 10 shows by way of example only, two different types of electromagnetically operated valves.

The upper valve of Fig. 10 may be visualized as representing valve 78. It comprises a conical valve member 170 seated on pipe 77 and urged by a spring 171 into the closed position. The valve is opened by energizing a coil 172 which upon energization attracts its core 173. The circuit of coil 172 is controlled by a switch 174 which is normally open and temporarily biased into the closed position by a cam disc 175 which may be visualized as being seated on cam shaft 166.

The second valve of Fig. 10 may be visualized as valve 87. The core 176 of this valve actuates by means of a rod 177 the valve proper which is not shown to simplify illustration. The exciting coil 177 of this valve is controlled by a normally open switch 179 and a cam disc 180 as described in connection with valve 78.

It should be understood that all the valves may be designed either in accordance with the upper valve or the lower valve of Fig. 10, or in any other suitable manner.

Reverting now to Fig. 1 in conjunction with Figs. 8 and 9, it is apparent that seven control steps must be performed during each cycle of operation. Accordingly, seven cam discs 181 to 187 are seated on cam shaft 166 for rotation in unison therewith. The encircled numbers shown in Figs. 1 and 8 in juxtaposition with the cam discs indicate the order in which the cam discs must perform their control functions. Each disc is engaged by a follower roll 188 to 194 and each follower roll is coupled with the respective component to be controlled by a rod 195, 111, 196, 197, 198, 199 and 145 respectively. The means for assuring cooperation between the follower rolls and the respective cam discs are not shown to simplify the drawing. Means suitable for the purpose are well known. They may comprise springs, or the cam rolls may be positively guided in camming grooves formed in the cam discs.

Fig. 8 shows diagrammatically suitable camming surfaces and the relative positions of the camming surfaces.

The time chart of Fig. 9 shows for a cycle of three minutes the sequence and the timing of the different operations effected during a complete cycle.

Let it be assumed that Fig. 1 illustrates the beginning of a cycle. According to Fig. 1, a measured quantity of fresh ground coffee is in container 90 and a second batch of coffee beans is in measuring space 36. Chamber 73 is filled with hot water maintained at the desired temperature by thermostat 75 and air pressure is built up in chamber 80 by the continuously running pump 82. The grinder is running idle at the moment.

The batch 142 in container 70 has been shown merely to indicate the location of ground coffee within the container but is not actually present in the operational stage just described.

The rotation of shaft 166, which as mentioned before makes one revolution every 3 minutes, causes cam disc 182 to actuate feed means 28 for a time sufficient to drop the coffee in storage container 99 into brewing container 70 while cover 101 is temporarily removed from opening 102. The coffee then occupies the position shown at 142 in container 70. The period of time required for the operation of the feed means is indicated on the outer circle of the time chart of Fig. 9.

Next valve 78 is operated by cam disc 186 to admit the hot water into container 70. As the water enters the container near the bottom thereof cyclonically directed by tuyères 155, the mixture of hot water in ground coffee within container 70 is strongly agitated thereby assuring a thorough extraction of the ground coffee. The time required for the entry of the hot water into container 70 is represented in the time chart by the distance mark 2. This time is followed by the required steeping or brewing time mark 3. At the end of the brewing period 3 valve 87 is opened by cam disc 183. As a result, air under pressure enters container 70 through chamber 73 effecting an agitation of the mixture within container 70 thereby causing further extraction of the coffee. Furthermore, the pressure built up within container 70 causes the water deeply to penetrate into the particles of coffee for the purpose of completely extracting the desirable ingredients therefrom without dissolving undesirable ingredients such as fat and waxes since the temperature of the water is kept at a temperature preventing such dissolution, that is below the melting point of most of the fats and waxes contained in coffee. The time required for this operation is marked by the distance 4 on the time chart.

Cam disc 185 becomes now effective to open valve 169. Due to the pressure built up in container 70, the beverage therein is rapidly and completely forced out through pipes 148, 149 and 150, the used coffee ground being retained by netting 141. The discharge time is indicated by the distance 5 on the time chart.

The brewing of the beverage and the discharge thereof from container 70 are now completed.

Next, cam disc 187 which as shown in Fig. 8 has a double camming surface, pivots tray 140 into the open position of Fig. 6. The time required for pivoting tray 140 is marked on the time chart by the distance 6.

Shortly thereafter and while the tray is open, cam disc 184 opens valves 167 and 168. As a result, flushing water flows into the container 70 through pipes 152, 149 and 148. The water through pipe 152 being cyclonically introduced into the upper part of the container through tuyères 155 effects a thorough cleaning of the upper part of the container walls and the water admitted through pipe 148 flushes tray 140 and netting 141. The used coffee ground and the flushing water are discharged through the bottom opening 146 and along apron 157. The time required for the flushing operation is marked on the time chart by the distance 6.

Shortly thereafter and while the tray is open, cam disc 184 opens valves 167 and 168. As a result, flushing water flows into the container 70 through pipes 152, 149 and 148. The water through pipe 152 being cyclonically introduced into the upper part of the container through tuyères 155 effects a thorough cleaning of the upper part of the container walls and the water admitted through pipe 148 flushes tray 140 and netting 141. The used coffee ground and the flushing water are discharged through the bottom opening 146 and along apron 157. The time required for the flushing operation is marked on the time chart by distance 7.

Finally, the second camming surface of cam 187 causes reclosing of tray 140 which is marked on the time chart by distance 8.

The inner circle of the time chart shows that during the aforedescribed sequence of operations disc 181 controlling the feeding of a new batch of coffee beans to the grinding means becomes effective. According to the time chart the control lever 44 is moved from the position of Fig. 1 into the position of Fig. 2 simultaneously with the opening of air valve 87. The operation of the measuring means 25 is indicated by distance 9 on the time chart. This distance is followed by the distance mark 10 which represents the grinding time. While there is a certain freedom in correlation of the grinding operation with the previously described operations, it is essential that the grinding operation is completed before the end of the brewing cycle so that the machine is ready to start a new batch of coffee. However, the grinding operation may occupy practically the entire 3 minutes cycle. A slow grinding affords the advantage that the coffee remains cool while being ground.

The coffee discharged through pipe or spout 150 may be collected in any suitable storage container, and the machine, or more specifically motor 160 thereof, may be started whenever a new supply of coffee is desired and stopped when sufficient coffee is prepared. However, the invention further contemplates means to control the starting and stopping of the coffee making machine by the quantity of coffee contained in a storage container.

Figs. 11 through 14 show devices and a circuit system suitable for the purpose.

Figure 14:
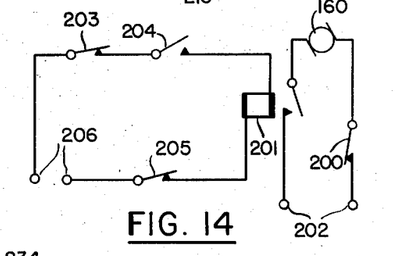
Fig. 14 is a circuit diagram suitable for use in the control and dispensing devices according to Figs. 11, 12 and 13.

Referring first to the circuit diagram of Fig. 14, this diagram shows motor 160 connected through a main switch 200 and the switch contacts of a relay 201 to a suitable source of current 202. Main switch 200 is closed when it is desired to place motor 160 and with it the machine under the control of the switch contacts of the relay. The relay circuit is controlled by three switches 203, 204 and 205. As is apparent, the relay is connected to its source of current 206 only when all the three switches are closed.

Figure 11:
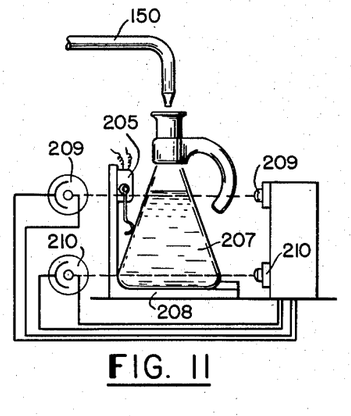
Fig. 11 is an elevational view of a control device for starting and stopping the coffee making machine under the control of the quantity of beverage contained in a storage container.

Referring now to Fig. 11, this figure shows a beaker 207 placed upon a suitable platform 208. The beaker is filled with coffee through discharge spout or pipe 150 and is dimensioned to be approximately filled by one batch of coffee prepared in the machine.

When the beaker is placed in the proper position on platform 208 it closes switch 205 which may be a microswitch. There are further provided two photocells 209 and 210 which are controlled by the level of coffee within beaker 207 and control switches 203 and 204. Photocell 209 is set so that it closes switch 203 when the liquid level sinks below the plane of its beam of light. Similarly, photocell 210 closes switch 204 when the liquid level sinks below the plane of its beam. In other words, both the switches 203 and 204 are only closed when the liquid level is below the plane of the lower beam, that is, when a new batch of coffee is needed. The upper beam prevents an over-filling of the beaker.

As is apparent, energization of relay 201 upon closing of all the switches starts motor 160.

Figure 12:
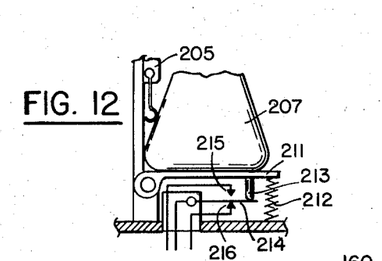
Fig. 12 is a fragmentary sectional view of a modification of the control device according to Fig. 11.

Fig. 12 shows a control device based upon the same principle, but using somewhat different means.

According to Fig. 12, beaker 207 rests upon a pivoted platform 211 supported by a spring 212. The position of platform 211 is controlled by the weight of coffee in container in beaker 207 and controls by suitable means such as an insulation pin 213 a contact tongue 214 disposed between two contacts 215 and 216. Contact 216 corresponds to photocell 209 and controls switch 203 and contact 215 corresponds to photocell 210 and control switch 204. As is apparent, contact 216 and with it switch 203 are closed as long as the content in beaker 207 and with it the weight of the beaker is above a certain value balanced by spring 212. When the valve sinks below the predetermined value, contact 216 is opened causing closing of switch 203 and when the liquid level sinks below a minimum level, contact 215 is closed causing closing of switch 204 and starting of motor 160.

Figure 13:
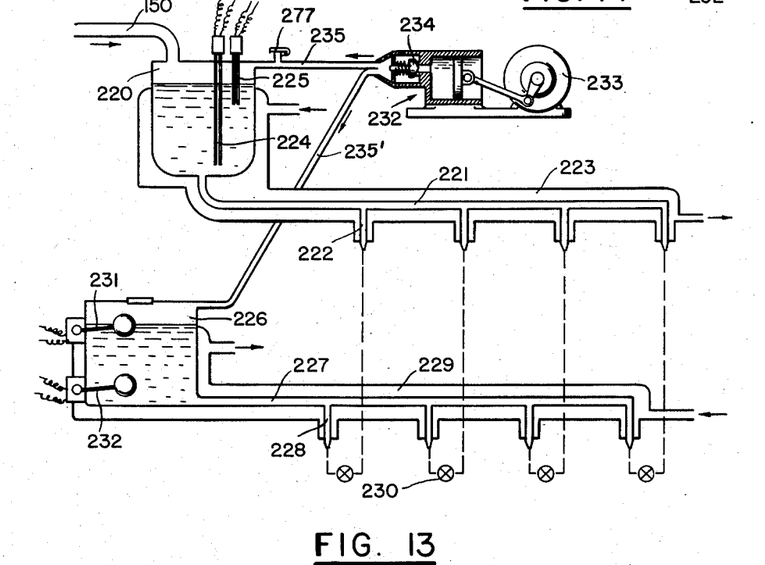
Fig. 13 is a diagrammatic view of dispersing means for dispensing a beverage either alone or in mixture with a second beverage at several tap points.

Fig. 13 employs the same principle as described in conjunction with Figs. 11 and 12 but provides means for dispensing coffee at several tap points. It also provides for the simultaneous admixing of milk or cream at the tap points if desired.

The upper part of Fig. 13 shows the coffee dispensing means and the lower part the milk or cream dispensing means.

The coffee prepared by the machine is collected in a container 220. From this container extends a tap line 221 having a desired number of tap points or spigots 222. The storage container 220 and the tap line with the spigots is jacketed by a jacket 223 to circulate hot water for the purpose of maintaining the coffee at a suitable temperature. To control the starting and stopping of the machine by the level of coffee in container 220, two capacitance probes 224 and 225 are provided. Each probe comprises two spaced electrodes, the capacitance of the probes being determined by the level of the coffee in the container due to the difference between the dielectric constant of coffee and air. Probe 224 probes the lower level of the coffee and probe 225 the upper level in the same manner as has been described for the photocells. The capacitance of the probes, in turn, controls switches 203 and 204. A switch corresponding to micro-switch 205 is not necessary in this arrangement.

The cream or milk is stored in a container 226 from which extends a tap line 227 having a desired number of taps 228. A jacket 229 serves to circulate a coolant to keep the milk or cream at a suitable low temperature. Mixing faucets or spigots 230 serve to dispense coffee mixed with cream or milk if desired.

The upper and lower level of the cream or milk in container 226 are controlled by floats 231 and 232 respectively which may be visualized as controlling a suitable supply of milk or cream in a manner similar to that described in connection with Fig. 14.

To produce the pressure necessary for the discharge of coffee and milk or cream at the tap points, a continuously running pump 233 is provided. The pump is shown as a rotary piston pump driven by a motor 233. The pump works against a spring loaded valve 234 and supplies air pressure to containers or tanks 220 and 226 through pipes 235 and 235' respectively. A relief valve 277 serves to prevent the build-up of an excessive air pressure.

As appears from the previous description, a variety of means may be employed to supervise the liquid content in the storage container. It should be understood that means other than those shown may be used and that the probe means shown in conjunction with one of the storage containers may also be used in association with the other storage containers.

It has been assumed in connection with the description of Figs. 11 through 14 that the coffee is supplied by the coffee making machine according to Fig. 1. However, it is evident that the function of the dispensing means of Figs. 11 through 14 is independent of the source of coffee and that the coffee may be supplied from any source.

Figs. 15 through 20 describe a spigot suitable for use in conjunction with the dispensing means of Figs. 11 through 14, but it should be understood that the spigot has independent utility.

The spigot of Figs. 15 through 20 is designed to dispense coffee and milk or cream only, or coffee and milk or cream simultaneously.

The spigot as shown comprises a distributing head 280 into which lead a coffee pipe 236 and a milk or cream pipe 237. Each pipe is jacketed by jackets 238 and 239 respectively to permit heating of the coffee and cooling of the milk or cream respectively. The two jackets are heat insulated from each other by an interposed layer 240 of suitable insulation material. The pipes and the jackets associated therewith also form a supporting arm for head 280 as can best be seen in Fig. 16.

Figures 15, 16, 17, 18, 19, 20:
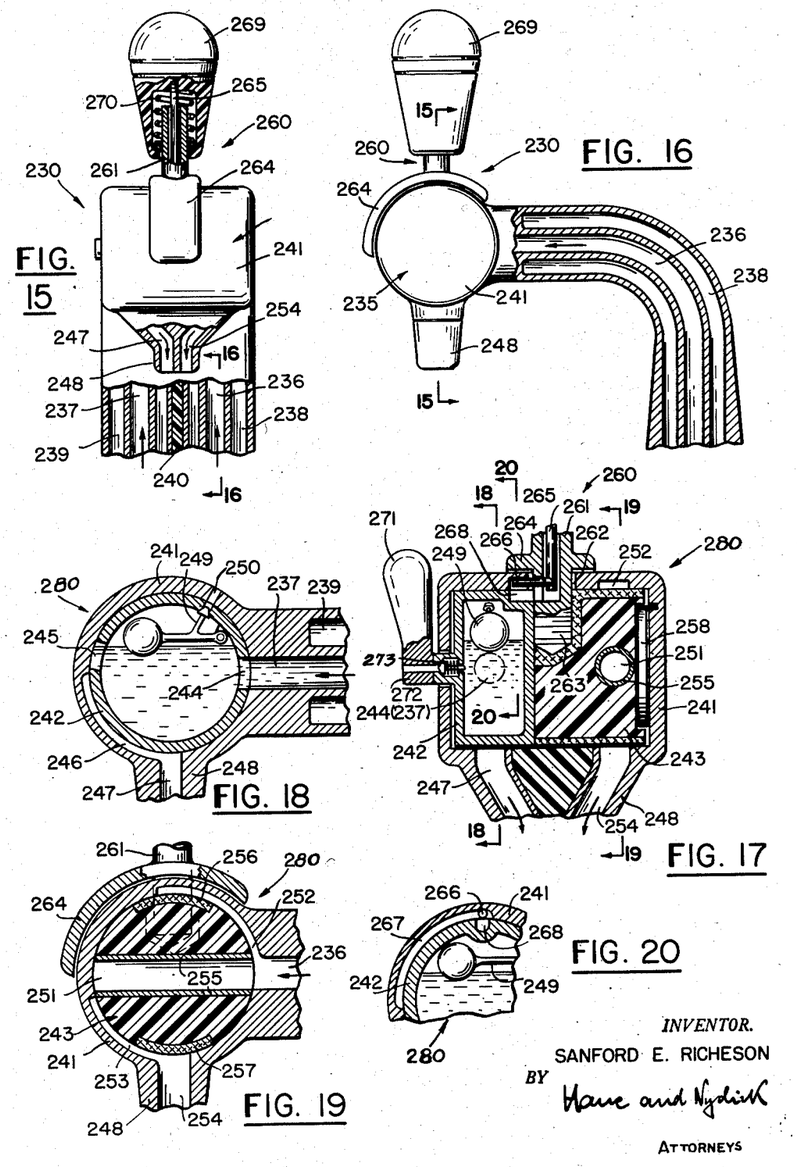
Fig. 15 is a fragmentary front view, partly in section of a tap spigot for dispensing two beverages either separately or in mixture, the section of Fig. 15 being taken on line 15—15 of Fig. 16.
Fig. 16 is a side view of Fig. 15, partly in section taken on line 16—16 of Fig. 15.
Fig. 17 is a section through the head of the spigot according to Figs. 15 and 16.
Fig. 18 is a section taken on line 18—18 of Fig. 17.
Fig. 19 is a section taken on line 19—19 of Fig. 17.
Fig. 20 is a section taken on line 20—20 of Fig. 17.

The spigot head comprises a generally cylindrical housing 241 within which are independently rotatable two drum like members 242 and 243. Drum 243 forms a container for a supply of milk or cream. Its wall has an opening 244 which in the drum position of Fig. 18 registers with pipe 237 and a second opening 245 which in the said position faces the inner wall of housing 241 whereby it is closed. Upon rotation of drum 242 in counterclockwise direction as seen in Fig. 18, opening 244 is moved out of register with the supply pipe 237 and opening 245 is moved into register with a circumferential channel 246 provided in the inner wall of housing 241. Channel 246 is continued into a dispensing bore 247 in the spout 248 of head 280. A float valve 249 controls the liquid level in drum 242 and the ingress of make-up air through a bore 250 to prevent a partial vacuum within drum 242 when milk or cream is withdrawn therefrom.

Drum 243 is shown as being solid except for a bore 251 which in the position of Fig. 19 is in register with the coffee supply line 237. The drum is preferably made of heat insulating material to preserve the heat of the coffee and to protect the cold cream or milk from the hot coffee. The inner wall of housing 241 has two circumferentially extending channels 252 and 253. Channel 252 constitutes in effect an elongation of pipe 236 and channel 253 is continued into a coffee discharge bore 254 in spout 248. As can best be seen in Fig. 19, upon rotation of drum 243 in counterclockwise direction the end of bore 251 facing pipe 236 remains in registry with channel 252 but the opposite end of bore 251 facing the inner wall of housing 241 is moved into registry with channel 253 thereby connecting the supply pipe 236 with the discharge bore 254.

To protect the heat insulating material of drum 243 and to prevent any deterioration of the flavor of the coffee by extensive contact with the heat insulating material, a liner 255 and inserts 256 and 257 made of suitable protective material are preferably provided.

A return spring 258 such as a loaded spiral spring serves to retain drums 242 and 243 in the positions of Figs. 18 and 19 respectively, or to return the drums into these positions.

To operate the coffee dispensing drum 243 either independently of the cream or milk dispensing drum 242 or jointly therewith, a control and operating means 260 is provided. This means comprises a tubular member 261 which extends through a circumferentially elongated slot 262 into drum 243 and is secured therein by any suitable means such as a thread 263. A shoe 264 laterally extending from tube 261 serves to guide the latter and to cover slot 262. A rod 265 disposed within tube 261 supports a lateral pin 266 which can ride either in a circumferential groove 267 provided in the inner wall of housing 241 and corresponding in length substantially to slot 262 or in an indentation 268 in the outer wall of drum 242. The outer end of rod 265 is secured to a handle or grip 269 fitted upon tube 261. A loaded spring 270 biases rod 265 into the position of Fig. 20 in which pin 266 is within groove 267.

To rotate the coffee dispensing drum 243 only from the position of Fig. 17 or Fig. 19 into the coffee dispensing position, handle 269 is rotated in counterclockwise direction as seen in Fig. 16. As can best be seen in Fig. 20, pin 266 will ride in groove 267 thereby leaving stationary drum 242.

When it is desired to rotate drum 242 also into the milk or cream dispensing position, handle 269 is depressed while being rotated. As a result, pin 266 engages indentation 268 so that drum 242 is compelled to follow the turning of handle 269 and drum 243.

The spigot further comprises means for rotating the milk dispensing drum 242 only. These means are shown as a handle 271 secured by a boss 272 to drum 242 through the respective side wall of housing 241. A relief valve 273 within boss 272 permits the ingress of air into drum 242 when milk or cream is discharged therefrom either by means of handle 269 or handle 271.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for brewing a beverage by infusion extraction of flavor and other ingredients from a comminuted starting material, said device comprising an upright brewing container for receiving a charge of the starting material, said container having an opening for the admission of a charge of the starting material in its upper end and an opening for discharging the brewed beverage in its lower end, a jacket encompassing the container and constituting a storage chamber for heated extracting liquid, said storage chamber communicating with the lower part of said container first conduit means communicating with said storage chamber for supplying liquid to the same, second conduit means connecting said storage chamber to a source of air under pressure to build up air pressure in said storage chamber, a movable closure means for said charge opening to close the container at the upper end thereof, second movable closure means for said discharge opening, said second closure means including a perforated support tray for supporting the charge of starting material spaced apart from said discharge opening, a valve-controlled discharge conduit means communicating with the container through said discharge opening and said tray for discharging the brewed beverage through said opening, and control means controlling the communication between the container and the storage chamber, opening and closing of said liquid and air conduit means, said first and second closure means and said discharge conduit means in a predetermined sequence and at a predetermined time relationship so as to effect charging of the container with starting material, filling the container with liquid and air under pressure and discharging the brewed beverage.

2. A device according to claim 1, wherein a second jacket encompasses said first jacket, said second jacket constituting a chamber for air under pressure and communicating with said first jacket through said second conduit means.

3. A device according to claim 1 and further comprising third conduit means for connecting the container and a source of water in a flushing system for flushing said container subsequent to the discharge of the beverage therefrom, said third conduit means of the flushing system being also controlled by said control means.

4. A device according to claim 1, wherein heating means are disposed within said storage chamber and heat control means control said heating means for heating liquid in said storage chamber to a predetermined temperature and maintaining the liquid at said temperature.

5. A device according to claim 1 and further comprising measuring means for supplying a predetermined quantity of the starting material to the container through said charge opening, said measuring means being also controlled by said control means.

6. A coffee making machine comprising, in combination, measuring means for separating a predetermined quantity from a supply of coffee beans, grinding means for grinding said quantity of coffee beans, intermittently opening closure means between the measuring means and the grinding means for supplying successive measured quantities of coffee beans to the grinding means, a brewing container, a storage vessel for water communicating with said container, heating means for heating water in said storage vessel to a predetermined temperature, valve means included in said communication, valve controlled conduit means connecting said water storage vessel with a source of air under pressure, feed means including storage means for receiving a measured quantity of ground coffee from the grinding means and means for admitting said quantity of ground coffee into the brewing container for extraction by infusion of hot water, valve controlled discharge means for discharging the brewed coffee from the container, control means for actuating the aforesaid means, communication and control valves in a predetermined sequence and at a predetermined time relationship so as to measure, grind, feed, admit water and air under pressure into the container for brewing the coffee under strong agitation and pressure and discharge successive batches of coffee, and power means for actuating the grinding means and the control means.

7. A machine according to claim 6, wherein an inner jacket encompasses said brewing container to form said water storage vessel and an outer jacket encompasses the inner jacket to form a storage vessel for air under pressure, said water storage vessel communicating with the lower part of the container and said air storage vessel communicating with said water storage vessel.

8. A machine according to claim 7, wherein said control means effect successive opening of the communication between said container and said water storage vessel and of the communication between the air storage vessel and the water storage vessel whereby the air under pressure and water in the water storage vessel are forced into the container causing a strong agitation of water and ground coffee in the container.

9. A machine according to claim 8 and further comprising valve controlled flushing conduit means communicating with said brewing container and a source of flushing water, said flushing conduit means being controlled by said control means to be rendered effective for the admission of flushing water subsequent to the discharge of brewed coffee.

10. A machine according to claim 9, wherein said measuring means, said grinding means, said intermittently opening closure means, said feed means, said brewing container and said discharge means are disposed one above the other to effect gravity transportation of the coffee beans, the ground coffee and the beverage through the machine.

11. A machine according to claim 6, wherein said measuring means comprise an open receptacle of a capacity approximately corresponding to the desired quantity of coffee beans, and wherein said closure means under the control of said control means alternately open and close said receptacle for admitting a measured supply of coffee beans into the receptacle and discharging the same therefrom.

12. A machine according to claim 11, wherein said receptacle has at the top an inlet and at the bottom an outlet leading into the grinding means, and said closure means comprise two closure members alternately opening and closing said inlet and said outlet respectively under the control of said control means.

13. A machine according to claim 11, wherein wall portions of said receptacle are movable relative to each other to vary the capacity of said receptacle.

14. A machine according to claim 6, wherein said grinding means comprise a jacket for circulating a coolant therethrough to dissipate heat generated by the grinding operation.

15. A machine according to claim 14, wherein said jacket is included in conduit means communicating with said water storage vessel and a source of water for admitting water into said vessel as extracting water whereby the extracting water is preheated in the grinding means, 16. A machine according to claim 6, wherein said feed means comprise as storage means an open receiving receptacle for receiving and storing coffee ground in the grinding means, gate means on the receptacle for discharging ground coffee accumulated in said receiving receptacle, and as admitting means closure means for opening and closing the inlet opening in the brewing container, said container having an inlet opening, and wherein actuating means control both said gate means and said closure means so as to effect opening of the closure means prior to the opening of the gate means, and closing of the gate means prior to the closure means, said actuating means being controlled by said control means.

17. A machine according to claim 6, wherein said discharge means comprise a pivotally mounted tray forming the bottom of said brewing container, and valve controlled drain means communicating with said tray for discharging the beverage through said drain means.

18. A machine according to claim 17 wherein said tray is dished and a netting covers said tray for supporting and retaining ground coffee fed into the brewing container.

19. A machine according to claim 18, wherein valve controlled conduit means communicate with said container through a wall portion thereof and said drain means for directing flushing water through said container and said netting.

20. A machine according to claim 19, wherein actuating means coact with said pivotal tray so as temporarily to open the same for discharging used coffee ground from the container and to flush the tray and the netting.

21. A machine according to claim 6, wherein said control means comprise operating means successively operating the aforesaid communication, means and control valves temporarily to open the feed means for feeding a measured quantity of ground coffee into the brewing container, temporarily to open the communication for admitting hot water from the storage vessel into the container, temporarily to open, after a predetermined period of brewing time, the air conduit means and the discharge means to drain the coffee from the container, and temporarily to open the closure means for supplying the grinding means with a measured quantity of coffee beans, said opening of the closure means being initiated when and while the aforesaid operations are in progress.

22. A machine according to claim 21, wherein said discharge means comprise a tray covered with a netting for supporting ground coffee thereon, said tray being pivoted to the container to form the bottom thereof and having a drain opening for discharging brewed coffee from the container and actuating means for temporarily opening said tray to discharge used coffee ground from the container, and wherein valve controlled conduit means communicate with said container and said drain opening to direct flushing water through the container and the tray, said control means operating said operating means to open the tray subsequent the discharge of brewed coffee from the container, then temporarily to open said valve controlled flushing conduit means and finally to operate said operating means for reclosing the tray.

23. A machine according to claim 22, wherein said control means comprise as operating means a plurality of camming means one for each of the aforesaid operations, said camming means being disposed in a spacial relationship so as to effect the aforesaid sequence and timing of the operations.

24. A machine according to claim 6, wherein said power means comprise an electromotor and transmission means connecting the motor with said grinding means and said control means respectively, each of said transmission means including speed reduction means, and wherein an air pump means communicates with said air conduit means, said pump means being connected with said electromotor through transmission means including speed reduction means.

25. A machine according to claim 6, wherein said grinding means comprise two coacting relatively movable grinding members, and a jacket for a circulating coolant encompassing said grinding members to dissipate the heat generated by a grinding operation.

26. A machine according to claim 6 and further comprising second control means for controlling the starting and stopping of said power means, said second control means including a storage vessel for storing brewed coffee discharged from said machine, and switch control means controlled by the volume of coffee in said storage vessel and controlling an energizing circuit for said power means.

27. A machine according to claim 26 and further comprising a second normally open switch control means closable upon engagement with said storage vessel, said second switch control means being also included in said energizing circuit.

28. A machine according to claim 27, wherein said second switch control means comprise a pair of switch means controlled by a predetermined maximum and minimum level respectively of brewed coffee within said storage vessel, one of said switch means being set to be closed when the level of coffee is below the maximum level and the other when the level is below the minimum level, closing of both said switch means closing said energizing circuit.

29. A machine according to claim 27 wherein said second switch control means comprise a movable support for said storage vessel, the position of said support being controlled by the volume of coffee in the storage vessel, and wherein switch means are included in said energizing circuit, said switch means closing said circuit in response to a support position indicative of a volume of coffee depleted below a predetermined minimum.

30. A machine according to claim 29, wherein said switch means include a switch controlled to be open only in response to a position of the support indicative of a volume of coffee above a predetermined maximum volume and a switch controlled to be closed only in response to a position of the support indicative of a volume of coffee depleted below a predetermined minimum volume, closing of both said switches closing said energizing circuit.

References Cited in the file of this patent

UNITED STATES PATENTS

| | | |
|---|---|---|
| 423,127 | Childs | Mar. 11, 1890 |
| 1,237,357 | Maker | Aug. 21, 1917 |
| 1,376,287 | Meyfarth | Apr. 26, 1921 |
| 1,390,008 | Ardwino | Sept. 6, 1921 |
| 1,662,547 | Urtis | Mar. 13, 1928 |
| 1,736,460 | Pistoni et al. | Nov. 19, 1929 |
| 1,800,368 | Tomlinson | Apr. 14, 1931 |
| 1,869,720 | Strand et al. | Aug. 2, 1932 |
| 2,014,325 | Grilli | Sept. 10, 1935 |
| 2,367,179 | Arnold | Jan. 16, 1945 |
| 2,402,170 | Lund | June 18, 1946 |
| 2,433,054 | Lime | Dec. 23, 1947 |
| 2,487,933 | Martin | Nov. 15, 1949 |
| 2,638,839 | Raiteri | May 19, 1953 |
| 2,639,078 | Karlen | May 19, 1953 |
| 2,712,887 | King | July 12, 1955 |
| 2,718,843 | Jones | Sept. 27, 1955 |
| 2,745,334 | Schwall | May 15, 1956 |
| 2,750,871 | Landgraber | June 19, 1956 |

FOREIGN PATENTS

| | | |
|---|---|---|
| 382,151 | Germany | Sept. 29, 1923 |
| 471,493 | Italy | May 15, 1952 |
| 1,083,599 | France | June 30, 1954 |